| United States Patent [19] | [11] Patent Number: 4,753,736 |
| Reichgott | [45] Date of Patent: Jun. 28, 1988 |

[54] METHOD FOR REGENERATION OF CATION-EXCHANGE CONDENSATE POLISHERS

[75] Inventor: David W. Reichgott, Richboro, Pa.

[73] Assignee: Betz Laboratories, Inc., Trevose, Pa.

[21] Appl. No.: 20,791

[22] Filed: Mar. 2, 1987

[51] Int. Cl.$^4$ ............................ C02F 1/42; B01J 49/00
[52] U.S. Cl. .................................................. 210/674
[58] Field of Search ........................... 210/674; 521/26

[56] References Cited

U.S. PATENT DOCUMENTS 4,151,079  4/1979  Horembala .......................... 210/672
4,298,477  11/1981  Cole .................................... 210/674

FOREIGN PATENT DOCUMENTS 1157973  11/1983  Canada .

*Primary Examiner*—Ivars Cintins
*Attorney, Agent, or Firm*—Alexander D. Ricci

[57] ABSTRACT

A method for treating boiler water condensate to remove undesirable cations which comprises providing a bed of cation-exchange resin, passing water to be treated through said resin bed, and regenerating said resin with an aqueous solution of a salt comprising a volatile amine and an anion selected from anions which do not form precipitates with any cation present in the water to be treated under operational conditions, and wherein the volatile amine is optionally not the same as that employed as the corrosion inhibitor in the boiler water system. The preferred salts include cyclohexylamine citrate, methoxypropylamine citrate, diethanolamine citrate and monoethanolamine citrate. The proposed method is particularly advantageous since the anion of the regenerant salt is selected to avoid the formation of insoluble calcium salts.

8 Claims, No Drawings

METHOD FOR REGENERATION OF CATION-EXCHANGE CONDENSATE POLISHERS

FIELD OF THE INVENTION

This invention is concerned with the regeneration of ion-exchange resins used in water conditioning systems. Such resins are frequently employed in the pulp and paper industry.

BACKGROUND OF THE INVENTION

Cation resin ion-exchangers, regenerated with sodium chloride are used conventionally as condensate filters or polishers for industrial boiler systems to remove iron and copper particles as well as calcium or magnesium hardness traces. These high pressure boiler systems are subject to corrosion as a result of the release of sodium ions into the system, which ultimately creates hydroxide ion, with its associated corrosive action. Volatile amines are normally used in such systems as corrosion inhibitors, but in the exchange treatment, cationic amines exchange for sodium ion. The result is an increase in sodium ion concentration and the removal of the amine.

In U.S. Pat. No. 4,298,477 and its equivalent Canadian Pat. No. 1,157,973, there is disclosed a method for regenerating a cation exchange resin, wherein a salt of the corrosion inhibiting amine used in the system to be treated is employed in the exchange system as the regenerant salt. The patentee discloses specifically the use of morpholine sulfate and morpholine acetate as regenerant salts.

SUMMARY OF THE INVENTION

We have now unexpectedly found that the solution of an amine salt from a particular class of amine salts as the regenerate salt in a cation exchange resin produces unexpected results in the regeneration of cation-exchange condensate polishers over those disclosed in the aforementioned patents. Thus, the present invention is concerned with an improved method for the regeneration of cation-exchange condensate polishers wherein an amine salt is used which is formed from a volatile amine, which amine is not necessarily that used as the corrosion inhibitor in the boiler condensate, and an acid which is selected to avoid the formation of insoluble calcium salts.

Thus, in its broadest form, the present invention provides a method for treating boiler water condensate to remove undesirable cations which comprises providing a bed of cation-exchange resin, passing water to be treated through said resin bed, and regenerating said resin with an aqueous solution of a salt comprising a volatile amine and an anion selected from anions which do not form precipitates with any cation present in the water to be treated under operational conditions, and wherein the volatile amine is optionally the same as that employed as the corrosion inhibitor in the boiler water system.

The volatile amine may differ in the salt from that in the system, a feature which is attractive from the point of view of the commercial use of the proposed method.

The regeneration of a cation-exchange resin with the amine salt proposed results in attachment of the protonated form of the amine to the resin. In service, ion-exchange produces the protonated amine salts of contaminants in lieu of the sodium salts, as occurs for brine regeneration. Out of service, formation of insoluble calcium salts is avoided during the regeneration process.

The use of brine can result in the formation of sodium hydroxide in the boiler when the contaminants contain bicarbonate. The use of the present method does not, since amine and carbon-dioxide are both liberated with steam.

With the present method, the use of objectionable chlorides is avoided and the use of amine-sulfates can lead to calcium sulfate formation and plugging of the resin bed during regeneration. Surprisingly, calcium citrate is not found to form during the regeneration.

It should be noted, advantageously, that the use of chloride is avoided with the method of the present invention. Most zeolite regeneration systems are fabricated from stainless steel. Although such systems are designed for handling brine, acidic chlorides (such as is the case for amine hydrochlorides) are generally prohibited from use with stainless steel due to concerns over chloride-induced corrosion.

With the method of the present invention, the use of sulfate is avoided. Calcium is normally found within the ion-exchange bed as well as in the solution used to form the regenerant solution. Thus, the formation of calcium sulfate, which is a well-known foulant of ion-exchange resins, is precluded by the use of the citrate salt.

Surprisingly, calcium citrate does not form. While calcium citrate would be expected to form under the conditions given herein, the unexpected result is obtained that it does not form in the treatment solution. Furthermore, as will be apparent from the following example, there is actually an increase in calcium removal.

DETAILED DESCRIPTION OF THE INVENTION AND PREFERRED EMBODIMENTS

More specifically, the volatile amine used in the present method may be selected from those which are typically used as corrosion inhibitors in boiler water systems, but preferred are methoxypropylamine, morpholine, diethanolaminoethanol, diethanolamine, monoethanolamine and cyclohexylamine. Most preferred are the ethanolamines, methoxypropylamine and cyclohexylamine. Finally, a most preferred combination is to form the salt with methoxypropylamine and to use as the corrosion inhibitor in the boiler water system, cyclohexylamine. The preferred anions are selected from anions which do not form precipitates with calcium or iron. More preferred are anions selected from those of citric acid, oxalic acid, ethylenediaminetetraacetic acid, ascorbic acid and gluconic acid. Most preferred is citrate anion. The most preferred salts are cyclohexylamine citrate, methoxy-propylamine citrate, diethanolamine citrate and monoethanolamine citrate.

As indicated above, it is not necessary that the volatile amine used as the corrosion inhibitor also be used as the cation of the amine salt used to regenerate the system.

Typically, the resins found in condensate polishers can be subjected to the method of the present invention. DOW HCR-S (trade mark) is a sulfonated styrene divinylbenzene cation resin with 8% cross-linking and this is typical of those resins found in condensate polishers. The Rohm and Haas version of this particular resin is known as IR-120 Plus (trade mark). Other resins commonly found in condensate polishers are IR-200 (trademark) and IR-122 (trade mark).

In the following examples all parts and percentages are by weight unless otherwise expressed. It is to be understood that these examples are intended merely for purposes of illustration and the invention is not to be interpreted as limited thereto.

EXAMPLE 1

Experiments were conducted in one inch by four feet glass resin columns. The resin was obtained from an operating condensate polisher at a paper mill. 300 ml of wet resin were regenerated with 500 g of cyclohexylamine citrate or cyclohexylamine hydrochloride solution, with a concentration of 12% as the amine. The flow rate was 22 ml/min. The theoretical exchange capacity of the resin was approximately 0.6 equivalence. The effluent from the regeneration was collected and analyzed for the total amount of iron, copper, calcium, magnesium and sodium removed from the resin.

(1) Treatment at 100% of the stoichiometric amount needed for a complete regeneration. Resin was Dow HCR-S. (DA-1080 is a solution of cyclohexylamine citrate).

| | Treatment | | |
|---|---|---|---|
| Element | Cyclo/HCl | DA-1080 | % Improvement by DA-1080 |
| Fe | 0.150 g | 0.257 g | 71 |
| Cu | 0.0295 | 0.029 | — |
| Ca (as CaCO3) | 2.377 | 3.191 | 34 |
| Mg (as CaCO3) | 1.125 | 1.342 | 19 |
| Na | 1.511 | 1.484 | −2 |

(2) 6 #/ft3 regeneration, approximately 17% of capacity. Resin was Dow HCR-S.

| Element | Cyclo/HCl | DA-1080 | % Improvement by DA-1080 |
|---|---|---|---|
| Fe | 0.0354 g | 0.1696 g | 379 |
| Cu | 0.0076 | 0.0237 | 212 |
| Ca (as CaCO3) | 0.368 | 1.720 | 368 |
| Mg (as CaCO3) | 0.261 | 0.6539 | 151 |
| Na | 0.659 | 0.361 | −45 |

Thus, it can be seen that cyclohexylamine citrate shows a substantial increase in activity over cyclohexylamine hydrochloride as the regenerant salt.

EXAMPLE 2

Amberlite 200 (trade mark) sodium form resin was exhausted using 27 liters of a pH 9.0 solution containing 265 ppm of calcium, 175 ppm of magnesium, and 88 ppm of sodium. The resin was then regenerated to the amine form using one liter of a 5% solution (as amine). The concentration of cations removed during regeneration is given in the following table:

| | Concentration (ppm) of Cations Removed During Regeneration | | |
|---|---|---|---|
| Element | Cyclohexylamine/ Sulfate | Methoxypropyl amine/Hydro- chloride | Methoxy- propylamine/ citrate |
| Calcium | 1.676 | 0.492 | 2.915 |
| Magnesium | 2.015 | 1.204 | 1.714 |
| Sodium | 2.124 | 2.562 | 2.148 |

The methoxypropylamine/citrate solution was especially effective for removing calcium from the resin.

EXAMPLE 3

The resin was then exhausted with 120 liters of a solution containing 30 ppm of calcium, 8 ppm of magnesium, and 10 ppm of sodium at pH 9.0. The data in the following table show that the resin in the methoxypropylamine form provided the best exchange capacity for calcium and the minimum sodium leakage:

| | Calcium (as CaCO3) and Sodium Leakage During Exhaustion Cycle | | | | | | | |
|---|---|---|---|---|---|---|---|---|
| Liters of Efflu- ent | Cyclohexyl- amine/Sulfate | | Cyclo- hexyl- amine/HCl | | Methoxy- propylamine/ HCl | | Methoxy- propylamine/ Citrate | |
| | Ca | Na | Ca | Na | Ca | Na | Ca | Na |
| 10 | 0 | 1.2 | 0 | 7.7 | 0 | 3.6 | 0 | 5.4 |
| 20 | 0 | 0.7 | 0 | 2.0 | 0 | 2.3 | 0 | 4.0 |
| 30 | 0 | 1.1 | 0 | 2.1 | 0 | 1.6 | 0 | 3.2 |
| 40 | 0 | 3.8 | 0 | 3.9 | 0 | 1.1 | 0 | 2.6 |
| 50 | 0 | 8.9 | 0 | 8.8 | 0 | 1.5 | 0 | 2.0 |
| 60 | 0 | 13.1 | 0 | 11.8 | 0 | 5.6 | 0 | 1.7 |
| 70 | 0 | 16.5 | 0 | 13.8 | 0 | 14.1 | 0 | 1.5 |
| 80 | 0 | 18.0 | 1.0 | 15.4 | 1.0 | 24.0 | 0 | 1.3 |
| 90 | 0 | | 8.2 | 15.7 | 12.4 | 29.0 | 0 | 1.2 |
| 100 | 0 | | 29.0 | 15.1 | 39.0 | 28.0 | 0 | 1.5 |
| 110 | 3 | | 40.0 | 14.5 | 62.0 | 23.0 | 0 | 4.7 |
| 120 | 22 | | 47.0 | 14.6 | 90.0 | 13.5 | 0 | 12.1 |

Examples 2 and 3 show the efficacy of (methoxypropylamine) citrate for regeneration of condensate polisher resin.

EXAMPLE 4

Treatment solutions were prepared at active concentrations of 30% as cyclohexylamine and later diluted prior to use to 12%. As in the previous Examples, a one inch by four foot glass column containing 300 wet milliliters of fouled resin (DOW HCR-S [trade mark]) obtained from an operating paper mill was used. The volume of regenerant used was 500 mls. Regenerations were conducted at room temperature and at a flow rate of 22 mls/min. The amine salt solutions were adjusted to pH 7.5 with a few drops of cyclohexylamine before regenerations.

RESULTS

The effluent from the cyclohexylamine citrate regeneration was green in color, and no difficulties were experienced during the process. The effluent pH was 6.85.

With the cyclohexylamine sulfate regeneration, the resin column plugged up after approximately 20 to 30% of the regenerant solution had passed through. White calcium sulfate solids were seen throughout the resin column. This phenomenon was experienced previously and was the reason cyclohexylamine sulfate was not considered for use as an amine regenerant.

The regenerant effluent from the cyclohexylamine acetate study was a cloudy, reddish-brown solution with a pH of 6.13. The dispersed particles formed a brown solid when allowed to sit for a period of time. This solution was filtered through a 1.2 micron filter. The brown solid was completely removed and a clear solution was left. The solid was identified by infra-red spectroscopy as ferric acetate.

The following data were obtained from analyses of the effluents from the regenerations:

| Element | Cyclohexyl-amine/Citrate | Cyclohexyl-amine/Acetate | Filtered cyclohexyl-amine/Acetate |
|---|---|---|---|
| Fe | 0.286 | 0.101 | 0.0001 |
| Cu | 0.015 | 0.007 | 0.005 |
| Ca (as $CaCO_3$) | 3.662 | 2.520 | 2.556 |
| Mg (as $CaCO_3$) | 1.371 | 1.057 | 1.066 |
| Na | 1.297 | 1.316 | 1.337 |

The analysis of the filtered cyclohexylamine acetate regeneration effluent supports the identification of an iron salt as the precipitate.

The data in the table above are similar to the data obtained for cyclohexylamine citrate as set forth in Example 1.

CONCLUSIONS

1. Use of cyclohexylamine sulfate for a one step regeneration of cation exchange resin leads to the precipitation of calcium sulfate and pluggage of the resin bed.

2. Use of cyclohexylamine acetate for a one step regeneration of cation exchange resin leads to precipitation of ferric acetate, if the resin is fouled with iron. Since iron is a common foulant (as a result of corrosion or presence as a dissolved solid in waters that may leak into a condensate system), use of cyclohexylamine acetate is not recommended.

I claim:

1. A method for treating boiler water condensate to remove undesirable cations which comprises providing a bed of cation-exchange resin, passing water to be treated through said resin bed, and regenerating said resin with an aqueous solution of a citrate salt of a volatile amine.

2. A method of claim 1, wherein the volatile amine is selected from methoxypropylamine, diethanolaminoethanol, morpholine, cyclohexylamine, diethanolamine and monoethanolamine.

3. A method as claimed in claim 2, wherein the salt is cyclohexylamine citrate.

4. A method as claimed in claim 2, wherein the salt is methoxypropylamine citrate.

5. A method as claimed in claim 2, wherein the salt is diethanolamine citrate.

6. A method as claimed in claim 2, wherein the salt is monoethanolamine citrate.

7. A method according to claim 2 wherein the salt is morpholine citrate.

8. A method according to claim 2 wherein the salt is diethanolaminoethanol citrate.

* * * * *